US007007711B1

(12) United States Patent
Klinksiek et al.

(10) Patent No.: US 7,007,711 B1
(45) Date of Patent: Mar. 7, 2006

(54) DISPERSION NOZZLE WITH VARIABLE THROUGHPUT

(75) Inventors: Bernd Klinksiek, Bergisch Gladbach (DE); Dieter Schleenstein, Odenthal (DE); Wieland Hovestadt, Leichlingen (DE); Michael vom Felde, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 432 days.

(21) Appl. No.: 10/030,927

(22) PCT Filed: Jul. 4, 2000

(86) PCT No.: PCT/EP00/06277

§ 371 (c)(1),
(2), (4) Date: Jan. 11, 2002

(87) PCT Pub. No.: WO01/05517

PCT Pub. Date: Jan. 25, 2001

(30) Foreign Application Priority Data

Jul. 16, 1999 (DE) .......................................... 199 33 440

(51) Int. Cl.
*F16L 7/00* (2006.01)

(52) U.S. Cl. ............. 137/375; 137/246.22; 137/246.23; 137/625.37; 251/368

(58) Field of Classification Search ............ 137/625.37, 137/246.22, 246.23, 375; 251/368
See application file for complete search history.

(56) References Cited

U.S. PATENT DOCUMENTS

| | | | | |
|---|---|---|---|---|
| 3,004,551 A | * 10/1961 | Shafer | ................... | 137/246.16 |
| 3,706,320 A | * 12/1972 | Kalsi | .......................... | 137/487 |
| 4,188,174 A | * 2/1980 | Perkins | ........................ | 417/432 |
| 4,784,178 A | * 11/1988 | Kasaya et al. | .............. | 137/554 |
| 4,921,842 A | * 5/1990 | Henning et al. | ............ | 524/839 |

FOREIGN PATENT DOCUMENTS

| | | |
|---|---|---|
| CA | 2101876 | 2/1994 |
| EP | 0 685 544 | 12/1995 |
| FR | 2643287 | 8/1990 |
| GB | 997974 | 7/1965 M |

* cited by examiner

*Primary Examiner*—A. Michael Chambers
(74) *Attorney, Agent, or Firm*—Joseph C. Gil; Thomas W. Roy

(57) ABSTRACT

The invention relates to a dispersing device wherein the dispersed material has a variable throughput comprising a jet disperser which comprises at least one inlet for the materials to be dispersed, a chamber with a multiciplicity of openings arranged in rows along the chamber wall, which lead into an outlet chamber, and an outlet for the finally dispersed material, wherein the chamber comprises a displaceably mounted piston which, depending on its position within the chamber, partially or completely shuts off a specific number of the openings for the passage of the flow os dispersed material.

20 Claims, 5 Drawing Sheets

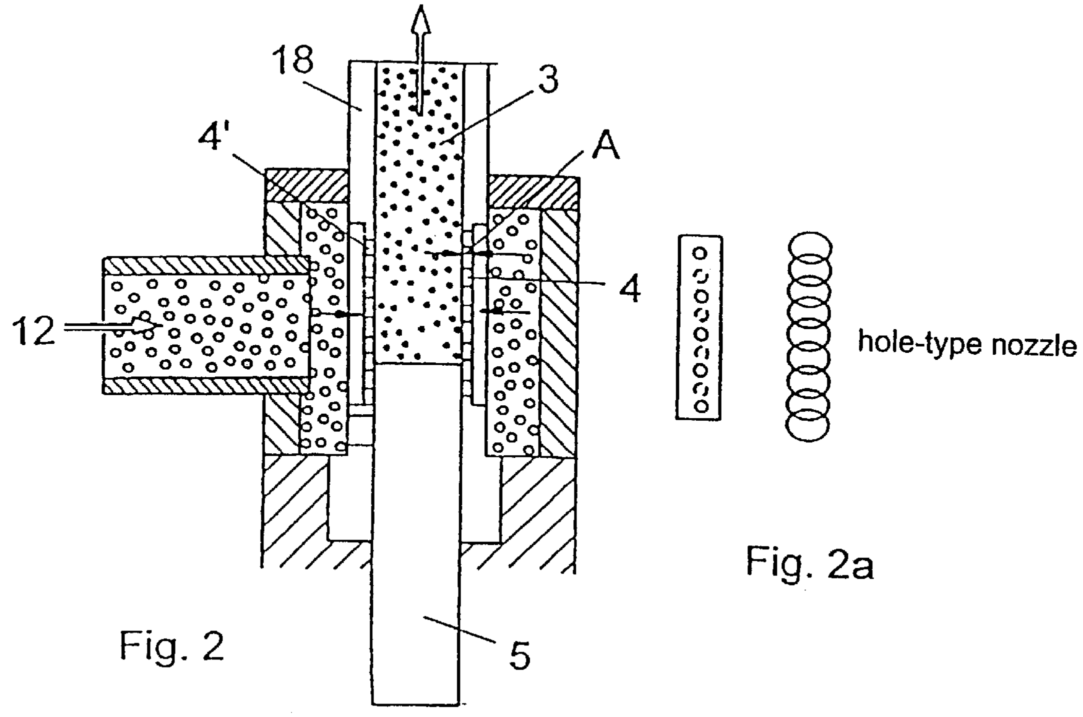
Fig. 2
Fig. 2a
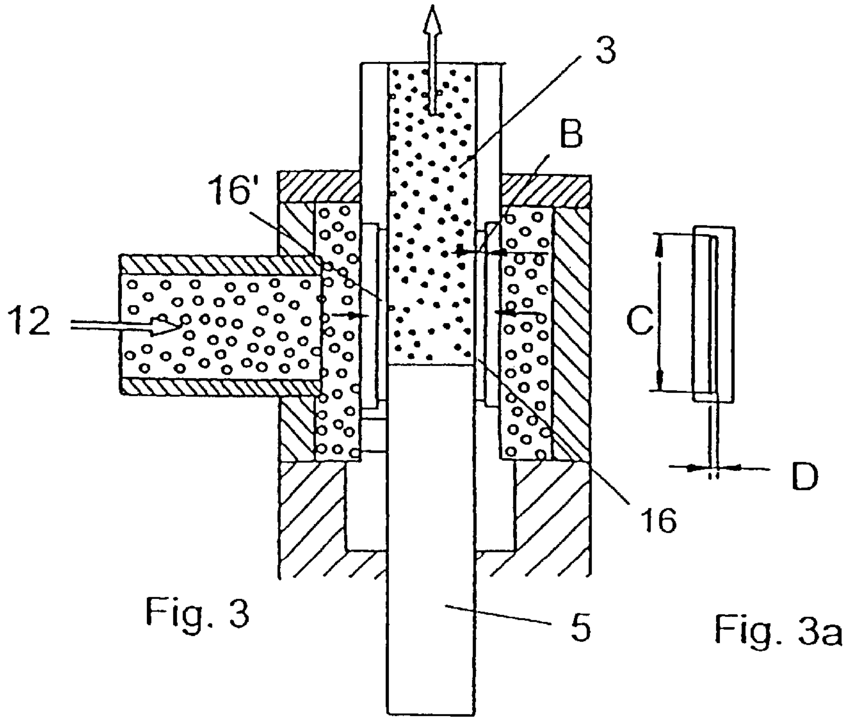
Fig. 3
Fig. 3a

DISPERSION NOZZLE WITH VARIABLE THROUGHPUT

BACKGROUND OF THE INVENTION

This invention relates to a dispersing nozzle with variable throughput, in particular with continuously variable throughput. In addition, a coating unit and a spray gun equipped with this dispersing nozzle is described. The dispersing device is based on the principle of a jet disperser, and consists of at least one inlet for the material to be dispersed, and of a chamber with a multiplicity of openings arranged in rows or slots along the chamber wall, which lead into an outlet chamber, and with an outlet for the finally dispersed material; within the chamber there is a displaceably mounted piston which, depending on its position within the chamber, partially or completely shuts off a specific number of the openings or slots for the passage of the flow of dispersed material.

A number of different dispersing devices for the mixing and dispersion of, for example, oil-water emulsions of differing composition, have been disclosed. These devices have in common the principle of energy uptake in a dispersing gap or in appropriately shaped bores of the devices. Here the dispersed material is generally driven through the gaps or bores under increased pressure in order to produce a required range of particle sizes in the emulsion, depending on the differential pressure.

Two-component polyurethane coatings (2K PU coatings) are not mixed together until shortly prior to application, owing to the only limited processing time (pot life) of the coatings. This pot life can range from a few minutes to hours, depending on the reactivity of the coating systems. Whereas such two-component systems have in the past been used dissolved in organic solvents, more recently a wealth of water-dispersible two-component systems have been developed. The water-dispersible two-component systems typically consist of a hydroxyl-containing resin component (binder, polyol) and of a polyisocyanate component (curing agent, cross-linking agent). Here the hydroxyl-functional resin component is generally in the form of an aqueous dispersion, and the polyisocyanate component is a hundred-per-cent anhydrous component or is dissolved in a solvent. Such systems are known, for example, from the document EP-A 583 728. A disadvantage of these coating systems is that the well-known coating quality of the two-component systems based on pure organic solvents has not yet been achieved in some fields of application.

This applies primarily in fields of application in which particularly high optical proper ties and a high resistance are required.

It is known that coating dispersions having as small a particle size as possible should be used in order to achieve coating surfaces of high quality. For this reason, polyol dispersions having a sufficiently small particle size of less than 500 nm, preferably 10 to 200 nm, are generally used in aqueous two-component polyurethane coatings. The dispersion of the per se hydrophobic isocyanate component is not carried out until shortly before the application of the coatings, because the polyisocyanate component reacts with water and therefore has only a limited stability in storage in the presence of water. However, the dispersion of the per se hydrophobic isocyanate component in the aqueous hydroxyl-functional resin dispersion by conventional static mixing devices causes considerable difficulties. The reason is to be seen in the fact that, in the course of the emulsification, the isocyanate component becomes stabilised on the surface of the emulsion particles already formed, so that the superficial stabilising layer is an obstacle to a further dispersion. Consequently, aqueous two-component polyurethane coating emulsions typically exhibit a bimodal particle-size distribution, with a first distribution maximum having a particle size which corresponds to that of the hydroxyl-functional resin dispersion and a second distribution maximum having a particle size of above 10,000 nm (isocyanate component), considerable proportions with particle sizes of above 20,000 nm still being present.

Polyisocyanates hydrophilised by chemical modification and polyisocyanates containing external emulsifiers have already been developed. These render possible a significantly easier dispersion by static mixing devices to an average particle size of less than 1000 nm, but they produce cured coating films which are insufficiently stable for many fields of application. Coating films with good stability are only obtained, however, by using hydrophobic polyisocyanate components.

The concept that the dispersibility of the isocyanate component is restricted by the stabilisation reaction which takes place on the surfaces of particles already present has prompted a search for practicable ways of achieving as finely-divided a dispersion as possible within very short periods of time, within which no appreciable surface stabilisation has as yet taken place. In particular, a heating process which would accelerate the reaction of the polyisocyanate with water is also to be avoided during the dispersion.

European Patent EP 685 544 A1 describes a process for producing aqueous two-component polyurethane coating emulsions by mixing binder resins together with polyisocyanates and water, wherein the mixture is pressed, under a pressure of 1 to 30 MPa, through a dispersing nozzle constructed on the principle of a one-step or multistep jet disperser. Special bimodal coating emulsions are produced in this case.

To make it possible to vary the throughput through such a jet disperser, a variant of the jet disperser is equipped with a multiplicity of bores, which can be covered in succession by means of a displaceable inlet pipe in order to discretely adjust the throughput through the emulsifying device.

Here the proposed construction of the disperser has proved to be very unfavourable, as the displaceable inlet pipe is wholly immersed in the solution to be dispersed. In the case of a relatively long operation, for example, with coating emulsions, this can lead to unwanted deposits. The roller propulsion indicated for the inlet pipe is likewise unfavourable, as it forms unwanted dead spaces and allows the dispersed material to escape. It has also been found disadvantageous that this nozzle cannot be regulated sufficiently rapidly, for example, within seconds, which is necessary in order to produce a constant quality of emulsion in cases where the batch quantities fluctuate.

The object of the invention is to develop a dispersing device which does not have the above-mentioned disadvantages and nevertheless renders possible, in particular, a continuous variation of the quantitative throughput of the dispersed material, while the quality of the dispersion remains constant.

It has been found, for example, that the bodywork of automobiles can particularly advantageously be provided with coatings of very high quality, if the emulsification of the polyisocyanate in the aqueous polyol component is effected continuously by means of the dispersing nozzle according to the invention immediately prior to introduction into the spray gun or atomising cone of a coating unit. However, there are problems in using known dispersing devices if, owing to the geometry of the automobile bodywork, the take-up of the coating fluctuates over very short intervals of time.

Thus, a further object of the invention is to provide a mixer for high-quality aqueous two-component polyurethane coatings which continuously produces a constant quality of emulsion in cases where the batch quantities fluctuate.

Prevailing prior art provides spray guns which, owing to the complex design of their feed and mixing mechanisms, achieve only very short operating lives when used with coating systems containing abrasive fillers and subsequently have to be expensively cleaned, so that they are unsuitable in practice for rapidly reacting two-component coating systems containing fillers.

Accordingly, a further object of the invention is to render possible the direct processing of rapidly reacting coating systems and to integrate the dispersing device into a spray coating device (spray gun).

Surprisingly, this object is achieved by the following dispersing device described in more detail below.

SUMMARY OF THE INVENTION

The invention provides a dispersing device wherein the dispersed material has a variable throughput, based on a jet disperser and consisting of at least one inlet for the material to be dispersed, and of a chamber with a multiplicity of openings arranged in rows along the chamber wall, which lead into an outlet chamber, and with an outlet for the finally dispersed material, characterised in that in the chamber there is a displaceably mounted piston which, depending on its position within the chamber, partially or completely shuts off a specific number of the openings for the passage of the flow of dispersed material.

DETAILED DESCRIPTION OF THE INVENTION

A preferred form of the dispersing device has at least two rows of openings arranged one behind the other, which are arranged axially (that is, in the direction of the movement of the piston) displaced in the chamber wall.

The invention also provides a variant of the dispersing device consisting of at least one inlet for the material to be dispersed, and of a chamber with one or more slot-shaped openings arranged along the chamber wall, which lead into an outlet chamber, and with an outlet for the finally dispersed material, characterised in that within the chamber there is a displaceably mounted piston which, depending on its position within the chamber, partially or completely shuts off the slots for the passage of the flow of dispersed material. This variant renders possible a continuous adjustment of the throughput of the dispersed material.

A particular embodiment of the devices is characterised in that at least one rinsing hole having a cross-section larger than the cross-section of the openings or of the slots is attached at one end of the chamber. The withdrawal of the piston, with exposure of the rinsing hole, enables the chambers which have been in contact with the product to be more easily cleaned with a large flow of rinsing liquid (for example, surfactant-containing lye).

In a preferred embodiment of the invention, the piston and the chamber have a circular cross-section.

In particular, it has been found advantageous to connect a mixing nozzle—for example, for the polyisocyanate—immediately upstream of the dispersing device according to the invention. A raw emulsion is produced by introducing the polyisocyanate into the polyol component by means of this mixing nozzle. In this variant, an additional orifice mixer, which ensures a raw emulsion of comparatively good quality and prevents coarse components, is attached immediately downstream.

It is also possible, by using the dispersing device according to the invention, to decrease the solvent content of the dispersion considerably and preferably to dispense with a hydrophilisation of the polyisocyanate component. In particular, dispersions according to the invention having a solvent content of less than 15 wt. % can easily be produced. Depending on the pressure applied during the dispersion, the number of passages through the nozzle and the two-component system used, it is also possible to produce emulsions which are completely free of solvent and of hydrophilising agent.

The high surface qualities of the coatings attainable by the above-mentioned process can be directly related to the particle-size distribution of the emulsions.

At least the piston and/or the wall of the chamber consist of ceramic, or have a ceramic coating. Ceramic materials particularly used are zirconium oxide or SiC.

This also enables material being mixed (for example, components of coatings) which contains abrasive fillers (for example, SiC, quartz sand) to be processed for a longer period of time without trouble.

The principal part of the preferred dispersing device is a ceramic casing containing the homogenising bores and the ceramic piston. It has been found that the ceramic components have to be ground extremely accurately, in order to avoid a leakage flow between piston and casing. It has been found that component parts made of steel do not produce a comparably leakproof seal and consequently do not so readily facilitate the connection of individual bores. It has moreover been found, in particular, that the bores at the inlet side should be cut in such a way that they have very sharp edges. Metal oxides such as zirconium oxide or even harder materials are recommended as ceramic materials.

The dispersion device according to the invention can be operated either from the inside outwards or from the outside inwards, that is, the inlet and outlet can also be interchanged without thereby giving rise to adverse effects during the dispersion.

In order to avoid a coating film on the piston during the idle time, a rinsing lantern can be installed. The piston of the preferred device can be easily cleaned by means of a rinsing compartment adjacent to the chamber and separated from this chamber. Opposite the rinsing compartment, the inlet chamber is optionally sealed by additional ring seals.

The piston of the device is actuated preferably by means of an electric or pneumatic drive.

The dispersing device according to the invention can be adjusted within fractions of a second by pressure regulation, for example, via a pneumatic operation of the piston, in order, for example, in the case of a fluctuating throughput, to connect or disconnect a number of nozzles such that the same homogenising pressure and hence the same quality of emulsion is invariably ensured. If electric step motors are used, an adjustment in the ms range is also possible.

An approximately stepwise adjustment is achieved in particular if, for example, two rows of nozzle holes are axially—that is, viewed here in the direction of the movement of the piston—displaced relative to one another.

It has been found to be particularly advantageous if, instead of the nozzles arranged in rows, slots are used. It has been found that, if the slots are made only as wide as the bore diameter or optionally even smaller, a very constant operation and linear, completely step-free adjustment of the dispersing device becomes possible.

By means of the device according to the invention, two-component polyurethanes of the highest quality can be prepared with great latitude.

The geometry of the bores and slots should, in particular, be so dimensioned that an energy density of preferably $10^5$ to $10^7$ W/cm$^3$, preferably of $10^6$ to $10^7$ W/cm$^3$, in the dispersed material is attained. This is attained when, in the region of the bore or of the slot, the quantity of material removed is such that the length of the bore is 1 to 3 times as long, particularly preferably 1 to 2 times as long, as the diameter of the bore or the width of the slot.

The use of the dispersing device according to the invention renders accessible bimodal aqueous two-component polyurethane coating emulsions based on hydroxyl-functional resin dispersions and polyisocyanates, which have a particle-size distribution with a first distribution maximum at a particle size of less than 500 nm, preferably of 10 to 200 nm, and a second distribution maximum at a particle size of 200 to 2000 nm, preferably of 300 to 1000 nm. The particle sizes of the distribution maxima differ from one another in particular by a factor of 2. In particular, 99 wt. % of the particles of such an emulsion have a particle size of less than 5000 nm, preferably of less than 1000 nm.

All the previously known binders and cross-linking components used for two-component polyurethane coatings can also be used.

Suitable binder resins are, for example, polyacrylates, polyesters, urethane-modified polyesters, polyethers, polycarbonates or polyurethanes possessing groups which are reactive with isocyanate, in particular those having molecular weights in the range of 1,000 to 10,000 g/mol. Hydroxyl groups are preferably used as the groups which are reactive with isocyanate. The binder resins are generally used as aqueous dispersions.

Any organic polyisocyanates containing aliphatically, cycloaliphatically, araliphatically and/or aromatically bonded, free isocyanate groups are suitable as the polyisocyanate component. The polyisocyanate component should generally have a viscosity of 20 to 1,000 mPa.s, preferably of less than 500 mPa.s. But more highly viscous polyisocyanates may also be used if the viscosity of the polyisocyanate component is lowered by a corresponding solvent content.

Polyisocyanates particularly preferably used are those containing exclusively aliphatically and/or cycloaliphatically bonded isocyanate groups having an average NCO-functionality of between 2.2 and 5.0 and a viscosity of from 50 to 500 mPa.s at 23° C. At a correspondingly low viscosity, a dispersion with a sufficiently small particle size is successfully achieved according to the invention completely without the addition of solvent. Furthermore, the conventional additives and modifying agents known in coatings chemistry can be used.

The field of application of the dispersing device according to the invention is not limited to the use of systems of components developed specifically for water-dispersible coating systems such as are described, for example, in the above-mentioned European Patent. Rather, it is possible to use a multitude of two-component systems hitherto not dispersible in water. In general, however, where two-component systems developed specifically for dispersion in water are used, the energy of dispersion (that is, the pressure to be applied) will be particularly favourable using the dispersing device according to the invention.

Coating emulsions obtained with the dispersing device according to the invention are used preferably for the production of high-quality coatings on a great variety of substrates and materials such as wood, metals, plastics, etc. Such coating systems are preferably used for painting bodywork or sections of the bodywork in the initial coating of automobiles.

The dispersing device according to the invention can be used for a multitude of fields of application and dispersion tasks. The invention also provides the use of the dispersing device according to the invention for the dispersion and mixing of chemical products such as the above-mentioned water-based paints, film emulsions, silicone emulsions, and of pharmaceutical and cosmetic products such as ointments, creams or cleansing milk, or for the dispersion or homogenisation of natural products or food products, for example, juices, mixed drinks or milk products, most particularly milk or cream. The dispersing device according to the invention is also used for regulating flows of material and for carrying out rapid chemical reactions.

The invention further provides a coating unit for the application of multicomponent coating, comprising at least one painting station with spray units for the paint, feed pipes and pumps for the coating components and a mixing unit for the coating components, characterised in that the mixing unit contains a dispersing device according to the invention.

The described dispersing device according to the invention can also be used in a technically simplified and scaled-down embodiment in order to mix two components (for example, two-component polyurethane coatings) in a spray gun for direct spraying (so-called airless spraying process) for coating the surfaces of large objects, for example, tanks, in particular ballast tanks, hulls of ships, pipework or buildings. Here only a few bores, opposite to one another or displaced, are provided in the dispersing device for each of the two components. The mixed material can then be applied directly from the outlet of the dispersing device, which is constructed in the form of a nozzle, or through an additional spray nozzle directly connected to the dispersing device.

In addition, compressed air can also be supplied to the liquid components through the modified dispersing device by means of a separate air inlet, in order to improve the spray pattern.

Important advantages of using the preferred device are:

1. the suitability of the device for mixing together very rapidly reacting two-component coating systems for coatings, where the mixing cannot be carried out until immediately prior to the spraying process,
2. the efficient mixing together of the components even in cases where there is a large difference in the viscosities of the two components,
3. the lack of wear on the device, even where abrasive fillers such as, for example, SiC or $SiO_2$, are used,
4. the simple construction, as a result of which any cleaning which may possibly be required is considerably simplified, for example, by pushing the piston into the spray gun as far as the nozzle outlet,
5. the absence of seals even at high pressure (100 to 500 bar), as a result of which a cleaning after use can in most cases be omitted.

The invention renders possible the construction of a light and easily handled spray gun for hand spraying, which can be used in places which are difficult to access with the use of machines (shipbuilding).

A coating unit in which a simple conventional nozzle mixer is connected upstream of the dispersing device is preferred.

It is particularly preferable that an additional buffer store be provided between the mixing unit and the spray units.

The invention is explained in more detail below with the aid of the Figures.

These are as follows:

BRIEF DESCRIPTION OF THE DRAWINGS

FIG. 2: a cross-section through a variant of the dispersing device in FIG. 1 with opposite rows of axially displaced bores FIG. 2*a*: a detail drawing of the nozzle in FIG. 2 (lateral view) in order to illustrate the geometry of the nozzle FIG. 3: a cross-section through a variant of the dispersing device in FIG. 1 with slots 16, 16'

FIG. 3*a*: a detail drawing of the nozzle in FIG. 3 (lateral view) in order to illustrate the geometry of the nozzle

Figure 1:
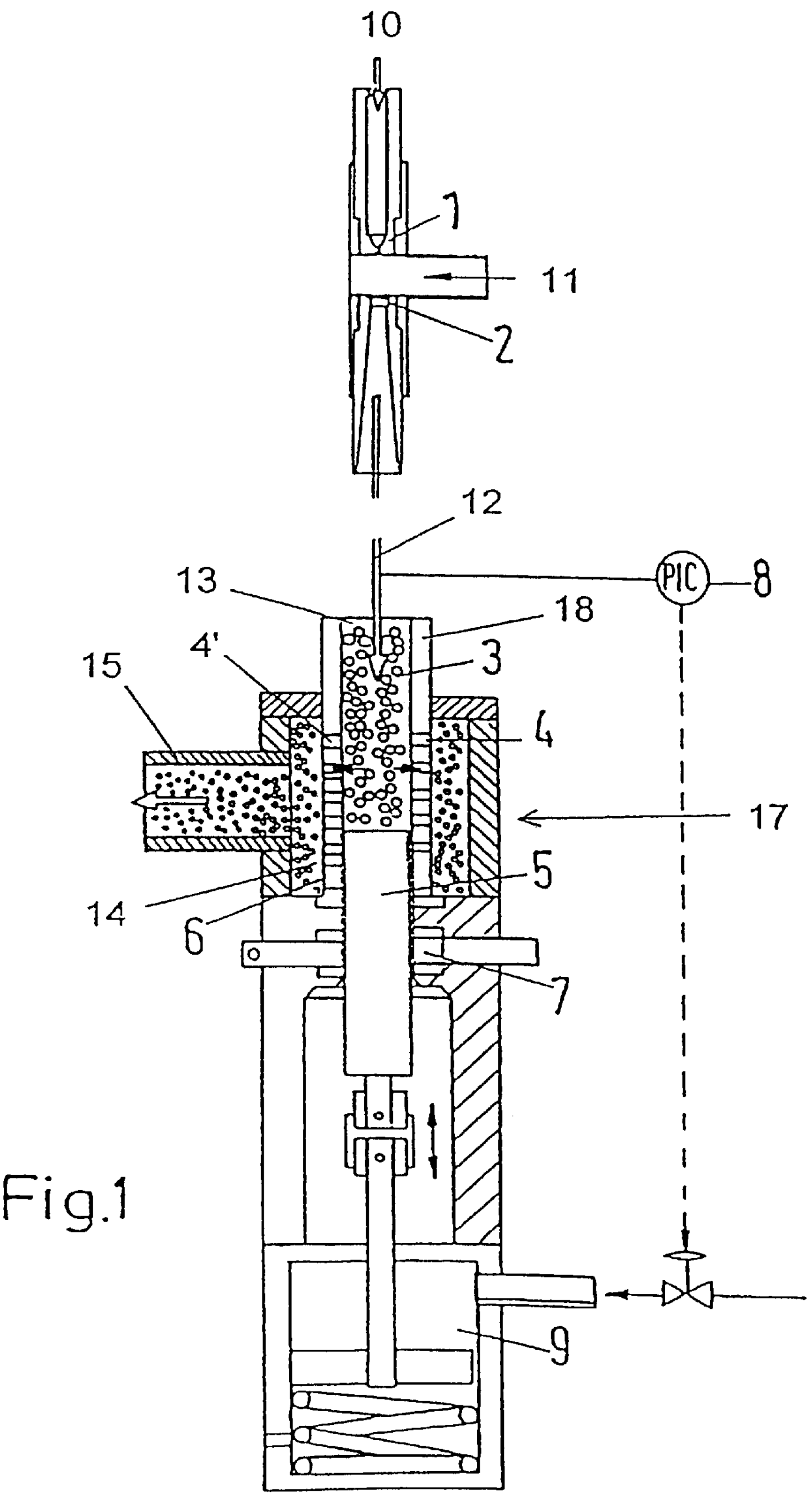
FIG. 1: a cross-section through a dispersing device according to the invention, with mixing nozzle connected upstream

In the Examples below, all percentages given are percentages by weight.

EXAMPLES

Example 1

A dispersing device has the following basic construction (FIG. 1):

The ceramic casing 18 surrounds the chamber 3 of the dispersing device and has a multiplicity of bores 4, 4', which lead into the outlet chamber 14. The raw emulsion 12, for example, produced from a preceding combination of mixing nozzle 1 and orifice mixer 2, enters at the inlet 13 of the dispersing device, is finely dispersed during the passage through the bores 4, 4' and flows across the outlet chamber 14, through the outlet 15 and out of the dispersing device. The ceramic piston 5 is arranged so as to be moveable in the chamber 3 and can be moved within the chamber 3 by means of the pneumatic drive 9, which is controlled by the pressure regulator 8. Depending on the position of the piston 5, the openings 4, 4' are closed at its inlet. The overall throughput of the raw emulsion depends upon the number of the remaining free openings 4, 4'.

FIG. 2 shows a form of the dispersing device, in which the straight rows of bores lying opposite one another along the direction of the movement of the piston 5 in the ceramic casing 18 are arranged slightly displaced relative to one another, so that their cross-sections, as indicated in the scheme on the right (FIG. 2*a*), overlap one another when viewed from the right side. The distance A in FIG. 2 represents the length of the bore.

FIG. 3 shows a dispersing device in which, instead of the straight rows of bores lying opposite one another along the direction of the movement of the piston 5 in the ceramic casing 18, are arranged slot nozzles 16, 16', in which the raw emulsion 12 is dispersed. The distance B in FIG. 3 represents the length of the slot 16. The distance C in FIG. 3*a* represents the depth of the slot 16 and the distance D in FIG. 3*a* represents the width of the slot 16.

Figure 5:
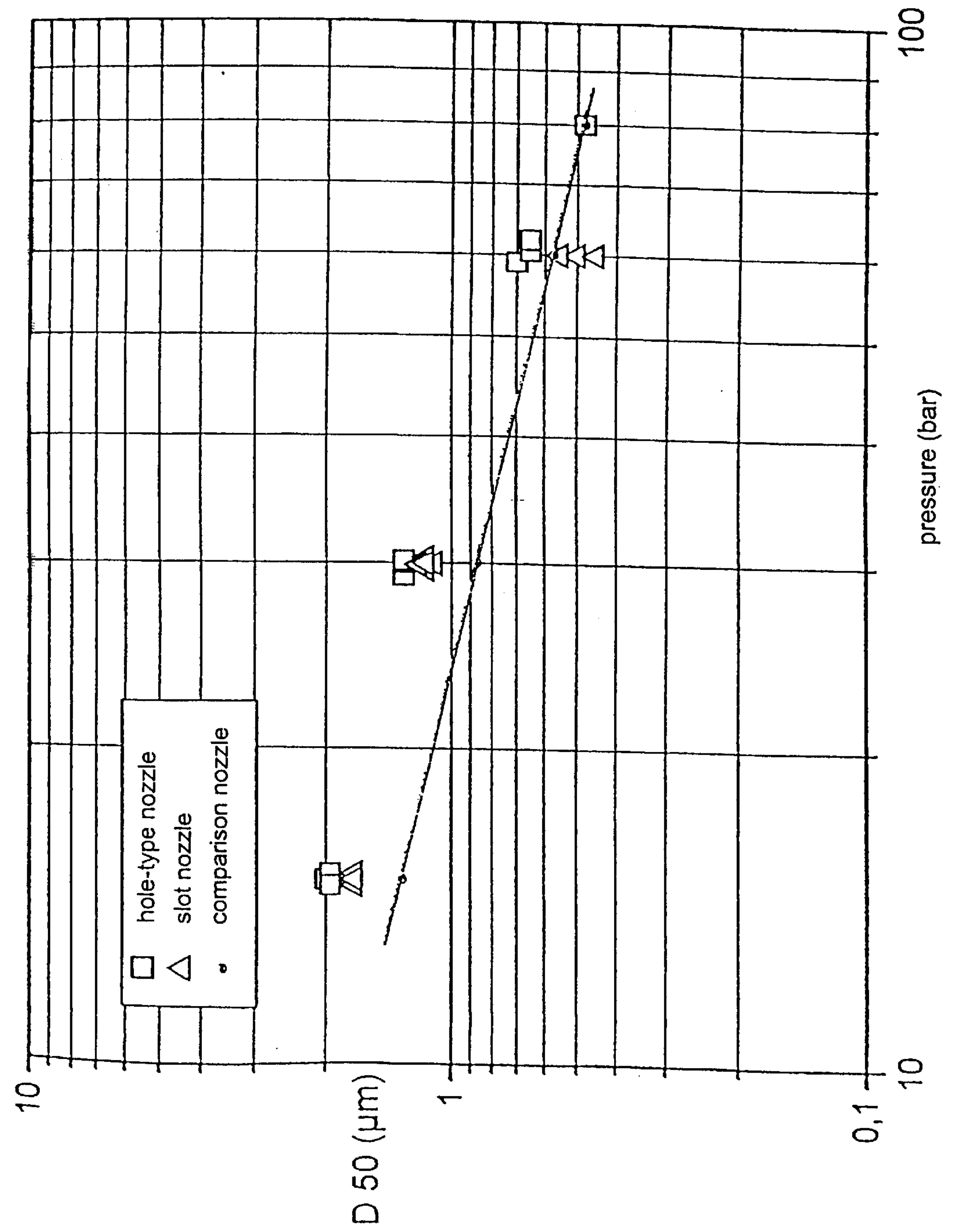
FIG. 5: a graph representing the average particle size as a function of the homogenising pressure for various dispersing devices.

Example of Use:

The continuous production of a paraffin oil emulsion (model emulsion) was carried out in various dispersers. The formulation was as follows:

4 parts paraffin oil of low viscosity
1 part emulsifier: Tween 80/Arlacel 80—surfactant mixture HLB 11.5 and
5 parts water The experimental results using a) an adjustable hole-type nozzle as in FIG. 2 having 10 holes of 0.1 mm, b) a 0.1 mm wide slot nozzle of 6 mm in depth and c) a jet disperser having fixed dimensions and with 2 bores of 0.1 mm are represented graphically in FIG. 5. The values (average particle size) for the smallest openings, a mean adjustment and the maximum opening are plotted for each of the adjustable nozzles.

The graph, which gives the average particle size as a function of the homogenising pressure, shows a good correspondence as regards the fineness of the dispersion (particle size) over the entire range of the throughput and the good mode of operation of the adjustable jet dispersers compared with the disperser having openings with a cross-section of fixed size.

Example 2

The continuous production of a two-component polyurethane coating was carried out in various dispersers. The formulation was as follows:

| | |
|---|---|
| Binder component: | |
| Bayhydrol VP LS 2271 ® (hydroxyl-functional polyacrylate dispersion, Bayer AG) | 30.39% |
| Bayhydrol VP LS 2231 ® (hydroxyl-functional, urethane-modified polyester dispersion, Bayer AG) | 33.28% |
| Byk 345 ® (coating additive, Byk Chemie GmbH) | 0.29% |
| Byk 333 ® (coating additive, Byk Chemie GmbH) | 0.30% |
| Distilled water | 7.65% |
| Curing component: | |
| Desmodur VP LS 2025/1 ® (coating polyisocyanate, Bayer AG) | 18.29% |
| Tinuvin 1130 ®, 50% in butyl diglycol acetate (light stabiliser, Ciba Spezialitätenchemie GmbH) | 1.85% |
| Tinuvin 292 ®, 50% in butyl diglycol acetate (HALS stabiliser, Ciba Spezialitätenchemie GmbH) | 0.92% |
| Butyl diglycol acetate/Solvesso 100 (1/1) | 7.03% |
| Total | 100.00% |

Figure 4:
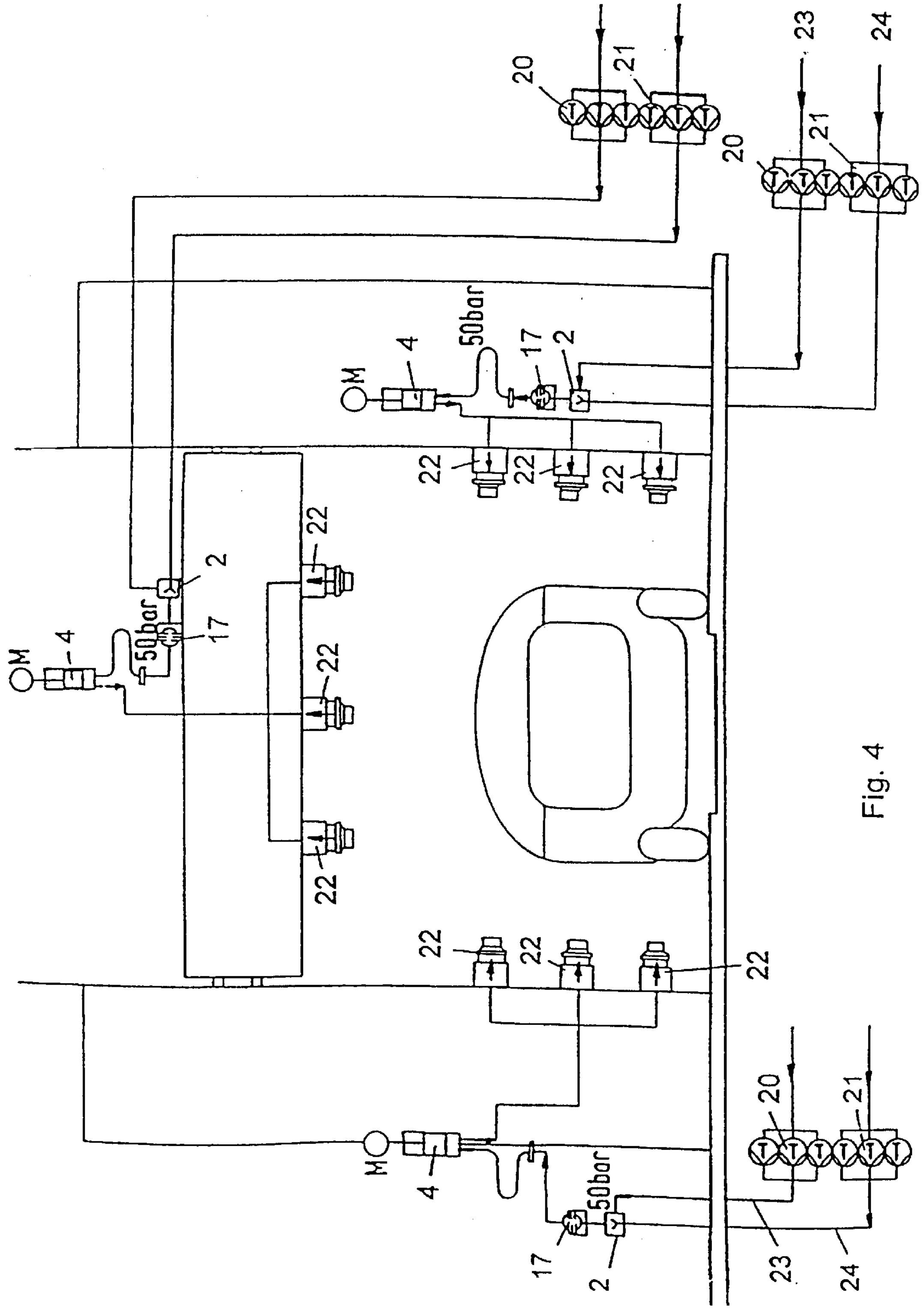
FIG. 4: the scheme of a coating unit with several dispersing devices according to the invention

The two components (binder component 23 and curing agent 24) were mixed and emulsified in a coating unit as in FIG. 4 having adjustable dispersing nozzles 17 as in FIG. 1, with mixers 1, 2 each connected upstream, using bores of 0.2 mm in width. The pumps 20, 21 created the required differential pressure.

The coating was applied electrostatically, via commercially available cones 22 with variable buffer volume 4 connected upstream, to zinc-coated steel plates in a layer thickness of 40 μm. The coating film was ventilated for 5 minutes at room temperature, predried for 10 minutes at 80° C. and cured for 30 minutes at 130° C.

The coating film had the following properties in use:

| | |
|---|---|
| König pendulum hardness (23° C.) | 190s |
| Gloss 20° | 88 |
| Resistance to solvents (xylene/fuel) (0 = very good, 5 = poor) | 0/1 |
| Resistance to chemicals: pancreatin/sulfuric acid/sodium hydroxide solution: | 2/1/0 |
| Scratch resistance: (Amtec Kistler laboratory car wash, 10 cycles): D gloss | 13 |

Example 3

Airless spray guns equipped with mixing device for two coating components.

A spray gun 36 of conventional construction, having a dispersing nozzle with variable throughput for airless spraying is described. The spray gun has the following construction:—

Figure 6:
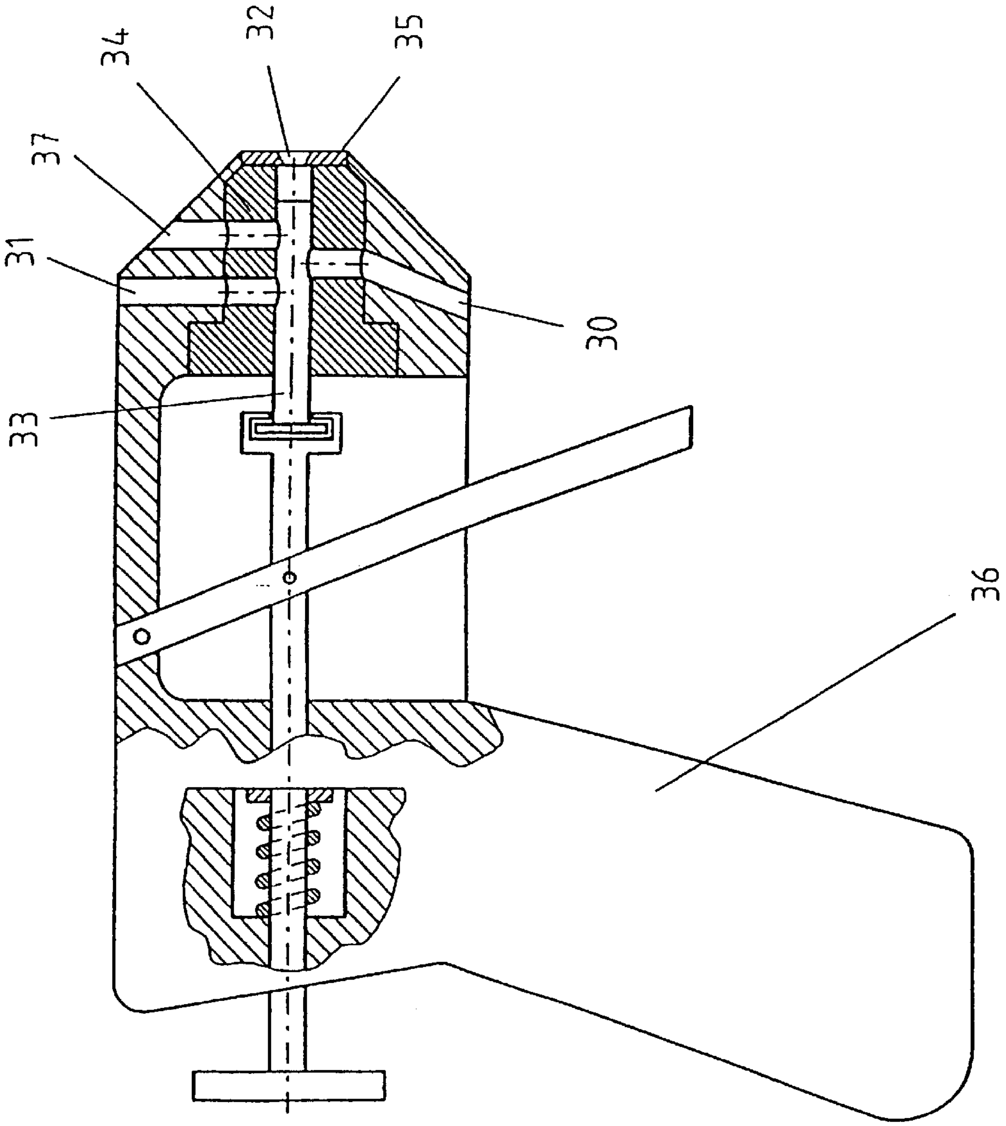
FIG. 6: the longitudinal section through a spray gun with a modified dispersing device as mixing chamber and spray nozzle.

Several bores 30, 31 for the components A (bore 30) and B (bore 31) pass through the body of the nozzle 34. In FIG. 6 only two of the bores are shown. Instead of the bores, several slots may also be arranged longitudinally along the mixing chamber 38.

The bores 30, 31 and 37 are connected to tubing (not shown), which supply the coating components or compressed air (bore 37).

The body of the nozzle 34 consists of ceramic (zirconium oxide). In the chamber 38 a nozzle valve 33, which consists of ceramic or hard metal (for example, tungsten carbide), is operated in the manner of a piston. The nozzle valve 34 closes the bores 30, 31 or slots for the passage of the material being dispersed, completely without the use of seals. On being pushed, the nozzle valve 34 removes all the remains of the product out of the chamber 38, so that a cleaning after use is necessary only in exceptional cases. From the chamber 38, the material being dispersed 32 can be sprayed directly or through an additional spray nozzle 35. To improve the spray pattern, additional spray air 37 can be supplied to the chamber.

What is claimed is:

1. A dispersing device wherein the dispersed material has a variable throughput comprising a jet disperser which comprises at least one inlet for the material to be dispersed, a chamber with a multiplicity of openings arranged in rows along the chamber wall, which lead into an outlet chamber, and an outlet for the finally dispersed material, wherein the chamber comprises a displaceably mounted piston which, depending on its position within the chamber, partially or completely shuts off a specific number of the openings for the passage of the flow of dispersed material and wherein at least the piston and/or the wall of the chamber comprise a ceramic or a ceramic coating.

2. The dispersing device of claim 1 comprising the inlet (13), the material to be dispersed (12), the chamber (3), the openings (4, 4'), the outlet chamber (14), the outlet (15), and the displaceably mounted piston (5).

3. The dispersing device of claim 2 wherein the piston and the chamber have a circular cross-section.

4. The dispersing device of claim 1 wherein one or more of the openings are slot-shaped openings.

5. The dispersing device of claim 1 wherein at least one rinsing hole having a cross-section larger than the cross-section of the openings is attached at one end of the chamber.

6. The dispersing device of claim 1 wherein the piston is actuated by means of an electric or pneumatic drive.

7. The dispersing device of claim 1 wherein the piston can be cleaned in a rinsing compartment adjacent to the chamber and separated from the chamber.

8. The dispersing device of claim 1 wherein the ceramic or the ceramic coating comprises zirconium oxide.

9. The dispersing device of claim 1 wherein two rows of openings are arranged one behind the other and are axially displaced in the chamber wall.

10. The dispersing device of claim 1 having at least two inlets and at least two rows of openings are connected to separate inlets for the material.

11. The dispersing device of claim 1 wherein the outlet has the form of an atomizing nozzle or an atomizing nozzle is connected immediately downstream of the outlet.

12. A spray gun comprising the dispersing device of claim 1.

13. The spray gun of claim 12 wherein the chamber comprises an additional connection for compressed air.

14. A coating unit for the application of a multicomponent coating, comprising at least one painting station with spray aggregates for the paint, and feed pipes, pumps, and a mixing unit for the coating components, wherein the mixing unit comprises the dispersing device of claim 1.

15. The coating unit of claim 14, further comprising a nozzle mixer connected upstream of the dispersing device.

16. The coating unit of claim 14 further comprising an additional buffer store between the mixing unit and the spray aggregates.

17. A process of dispersing, homogenizing, or mixing of chemical products, pharmaceutical products, cosmetic products, natural products or food products comprising introducing the products into the dispersing device of claim 1.

18. The process of claim 17, wherein the product is a water-based paint, a film emulsion, a silicone emulsion, an ointment, a cream, a cleansing milk, a juice, a mixed drink or a milk product.

19. A process of regulating a flow of a material comprising introducing the material into the dispersion device of claim 1.

20. A process for carrying out rapid chemical reactions comprising introducing the material into the dispersion device of claim 1.

* * * * *